(12) United States Patent
Miller et al.

(10) Patent No.: US 11,899,986 B2
(45) Date of Patent: *Feb. 13, 2024

(54) EXPANDING AN ADDRESS SPACE SUPPORTED BY A STORAGE SYSTEM

(71) Applicant: PURE STORAGE, INC., Mountain View, CA (US)

(72) Inventors: Ethan Miller, Santa Cruz, CA (US); John Colgrove, Los Altos, CA (US); John Hayes, Mountain View, CA (US)

(73) Assignee: PURE STORAGE, INC., Santa Clara, CA (US)

(*) Notice: Subject to any disclaimer, the term of this patent is extended or adjusted under 35 U.S.C. 154(b) by 36 days.

This patent is subject to a terminal disclaimer.

(21) Appl. No.: 17/508,533

(22) Filed: Oct. 22, 2021

(65) Prior Publication Data
US 2022/0043607 A1 Feb. 10, 2022

Related U.S. Application Data

(63) Continuation of application No. 16/519,832, filed on Jul. 23, 2019, now Pat. No. 11,169,745, which is a continuation of application No. 14/073,637, filed on Nov. 6, 2013, now Pat. No. 10,365,858.

(51) Int. Cl.
G06F 3/06 (2006.01)
G06F 12/1009 (2016.01)
G06F 12/1036 (2016.01)

(52) U.S. Cl.
CPC ............ G06F 3/0665 (2013.01); G06F 3/064 (2013.01); G06F 3/0626 (2013.01); G06F 3/0688 (2013.01); G06F 12/1009 (2013.01); G06F 12/1036 (2013.01)

(58) Field of Classification Search
None
See application file for complete search history.

(56) References Cited

U.S. PATENT DOCUMENTS

| 5,208,813 A | 5/1993 | Stallmo |
| 5,381,537 A | 1/1995 | Baum et al. |

(Continued)

FOREIGN PATENT DOCUMENTS

| CN | 103370685 A | 10/2013 |
| CN | 103370686 A | 10/2013 |

(Continued)

OTHER PUBLICATIONS

International Search Report and Written Opinion, PCT/US2014/062428, dated Dec. 19, 2014, 8 pages.

(Continued)

Primary Examiner — Charles J Choi

(57) ABSTRACT

An apparatus, method, and computer-readable storage medium for allowing a block-addressable storage device to provide a sparse address space to a host computer. The storage device exports an address space to a host computing device which is larger than the storage capacity of the storage device. The storage device translates received file system object addresses in the larger address space to physical locations in the smaller address space of the storage device. This allows the host computing device more flexibility in selecting addresses for file system objects which are stored on the storage device.

20 Claims, 5 Drawing Sheets

(56) References Cited

U.S. PATENT DOCUMENTS

| | | |
|---|---|---|
| 5,403,639 A | 4/1995 | Belsan et al. |
| 5,940,838 A | 8/1999 | Schmuck et al. |
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Tamai et al. |
| 6,834,298 B1 | 12/2004 | Singer et al. |
| 6,850,938 B1 | 2/2005 | Sadjadi |
| 6,915,434 B1 | 7/2005 | Kuroda et al. |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,725,675 B2 | 5/2010 | Beniyama et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,200,887 B2 | 6/2012 | Bennett |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | LeCrone et al. |
| 9,009,385 B1 | 4/2015 | Juels et al. |
| 9,081,713 B1 | 7/2015 | Bennett |
| 9,189,334 B2 | 11/2015 | Bennett |
| 9,311,182 B2 | 4/2016 | Bennett |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,448,919 B1* | 9/2016 | Boyle .................. G06F 12/02 |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,632,870 B2 | 4/2017 | Bennett |
| 10,365,858 B2 | 7/2019 | Miller et al. |
| 11,169,745 B1 | 11/2021 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0084209 A1* | 5/2003 | Chadalapaka ...... H04L 67/1097 |
| | | 710/5 |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Jeda et al. |
| 2007/0094440 A1 | 4/2007 | Torabi |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0250970 A1 | 9/2010 | Ejiri |
| 2010/0281225 A1 | 11/2010 | Chen et al. |
| 2010/0287327 A1 | 11/2010 | Li et al. |
| 2011/0017192 A1 | 1/2011 | Arslan et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0011340 A1 | 1/2012 | Flynn et al. |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0166715 A1* | 6/2012 | Frost .................... G06F 3/0656 |
| | | 711/E12.008 |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0282953 A1* | 10/2013 | Orme .................... H04L 12/66 |
| | | 711/102 |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0003142 A1 | 1/2014 | Lee et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281307 A1 | 9/2014 | Peterson et al. |
| 2014/0281308 A1 | 9/2014 | Lango et al. |
| 2014/0325115 A1 | 10/2014 | Ramsundar et al. |
| 2014/0359245 A1* | 12/2014 | Jones .................... G06F 3/0608 |
| | | 711/170 |
| 2015/0033002 A1 | 1/2015 | Cordero et al. |
| 2015/0127923 A1 | 5/2015 | Miller et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |
| 2018/0081562 A1 | 3/2018 | Vasudevan |

FOREIGN PATENT DOCUMENTS

| | | | |
|---|---|---|---|
| CN | 104025010 | B | 11/2016 |
| EP | 3066610 | A1 | 9/2016 |
| EP | 3082047 | A1 | 10/2016 |
| EP | 3120235 | A | 1/2017 |
| JP | 2007087036 | A | 4/2007 |
| JP | 2007094472 | A | 4/2007 |
| JP | 2008250667 | A | 10/2008 |
| JP | 2010211681 | A | 9/2010 |
| WO | 1995002349 | A1 | 1/1995 |
| WO | 1999013403 | A1 | 3/1999 |
| WO | 2008102347 | A1 | 8/2008 |
| WO | 2010071655 | A1 | 6/2010 |

OTHER PUBLICATIONS

Josephson et al., "DFS: A File System for Virtualized Flash Storage", ACM Transactions on Storage (TOS), Sep. 9, 2010, 15 pages, ACM, New York, NY, USA.

Kang et al., "Object-based SCM: An Efficient Interface for Storage Class Memories", Proceedings of the 2011 IEEE 27th Symposium on Mass Storage Systems and Technologies, May 23, 2011, 12 pages, IEEE Computer Society, Washington, DC, USA.

Lu et al., "Extending the Lifetime of Flash-based Storage through Reducing Write Amplification from File Systems", Proceedings of the 11th USENIX conference on File and Storage Technologies, Feb. 12, 2013, pp. 257-270, USENIX Association, Berkeley, CA, USA.

Microsoft Corporation, "Fundamentals of Garbage Collection", Retrieved Aug. 30, 2013 via the WayBack Machine, 11 pages.

Microsoft Corporation, "GCSettings.IsServerGC Property", Retrieved Oct. 27, 2013 via the WayBack Machine, 3 pages.

Zhang et al., "De-indirection for Flash-based SSDs with Nameless Writes", Proceedings of the 10th USENIX conference on File and Storage Technologies, Feb. 14, 2012, 16 pages, USENIX Association, Berkeley, CA, USA.

\* cited by examiner

EXPANDING AN ADDRESS SPACE SUPPORTED BY A STORAGE SYSTEM

CROSS-REFERENCE TO RELATED APPLICATIONS

This is a continuation application for patent entitled to a filing date and claiming the benefit of earlier-filed U.S. Pat. No. 11,169,745, issued Nov. 9, 2021, herein incorporated by reference in its entirety, which is a continuation of U.S. Pat. No. 10,365,858, issued Jul. 30, 2019.

BACKGROUND

Field of the Invention

This invention relates to storage systems and, more particularly, to techniques for implementing thin provisioning in storage devices.

Description of the Related Art

The use of solid-state storage devices (e.g., flash memory) in computer systems and storage systems is increasing due to the performance of flash memory as compared to traditional disk storage devices (e.g., hard disk drives (HDDs)). Flash memory offers low-power consumption combined with fast, random (input/output) I/O accesses as compared to traditional disk storage technology. Until recently, flash memory was used primarily in embedded applications, but the use of flash memory has expanded to other applications including desktop and enterprise storage.

Embedded applications which use flash memory typically include custom operating systems and custom file systems which are designed around the advantages and limitations of flash memory. However, when using flash memory in different applications, such as in desktop and enterprise storage, these systems often have legacy operating systems and file systems which are designed and optimized for use with HDD storage technology. These legacy operating systems and file systems are not able to take full advantage of all of the characteristics of flash memory. Also, these legacy systems may reduce the effective life of flash memory if wear leveling and other techniques are not utilized to prevent frequent writes to the same flash memory locations.

Additionally, inefficiencies are often introduced when integrating host storage systems with storage devices such as flash memory. For example, host file systems typically need to maintain a mapping between a logical location of a data block, as within a file, and the physical address of that block on the storage device. However, since the physical location of a block may change due to garbage collection and other device-internal processes, flash memory storage devices also maintain a mapping between the block address as provided by the host and the actual physical address of the block. Hence, these approaches require duplication of block mapping in both the file system and on the storage device itself.

In view of the above, improved systems and methods for providing more efficient interactions between host computing devices and storage devices are desired.

SUMMARY OF EMBODIMENTS

Various embodiments of apparatuses and methods for implementing thin provisioned storage devices are contemplated.

In one embodiment, a computer system may include a storage device coupled to a host computer, and the storage device may export a sparse address space to the host computer. The host computer may track file system objects and generate addresses for memory operations based on a file system object identifier (ID) and an offset within the file system object. In one embodiment, host computer may generate an object address for a data block by concatenating an object ID or number with an offset corresponding to the location of the data block within the object. The host computer may convey the object address to the storage device as part of a memory operation for this data block. This scheme simplifies address generation and allows the host computer to avoid having to maintain a mapping table of segments to physical locations.

The storage device may be configured to maintain mappings between the sparse address space utilized by the host computer and actual physical locations on the storage device. In one embodiment, the storage device may include a mapping table to map an object number and block offset combination to a physical storage location.

In one embodiment, the host computer may query the storage device to determine the storage capacity of the storage device. In response to receiving this query, the storage device may overstate its capacity to the host computer, responding with an amount of storage which exceeds the actual capacity of the storage device. In one embodiment, the storage device may respond to the query by informing the host computer that the storage device has the maximum possible capacity based on the size of the address field in the interface connection between the host computer and the storage device.

These and other embodiments will become apparent upon consideration of the following description and accompanying drawings.

Figure 1:
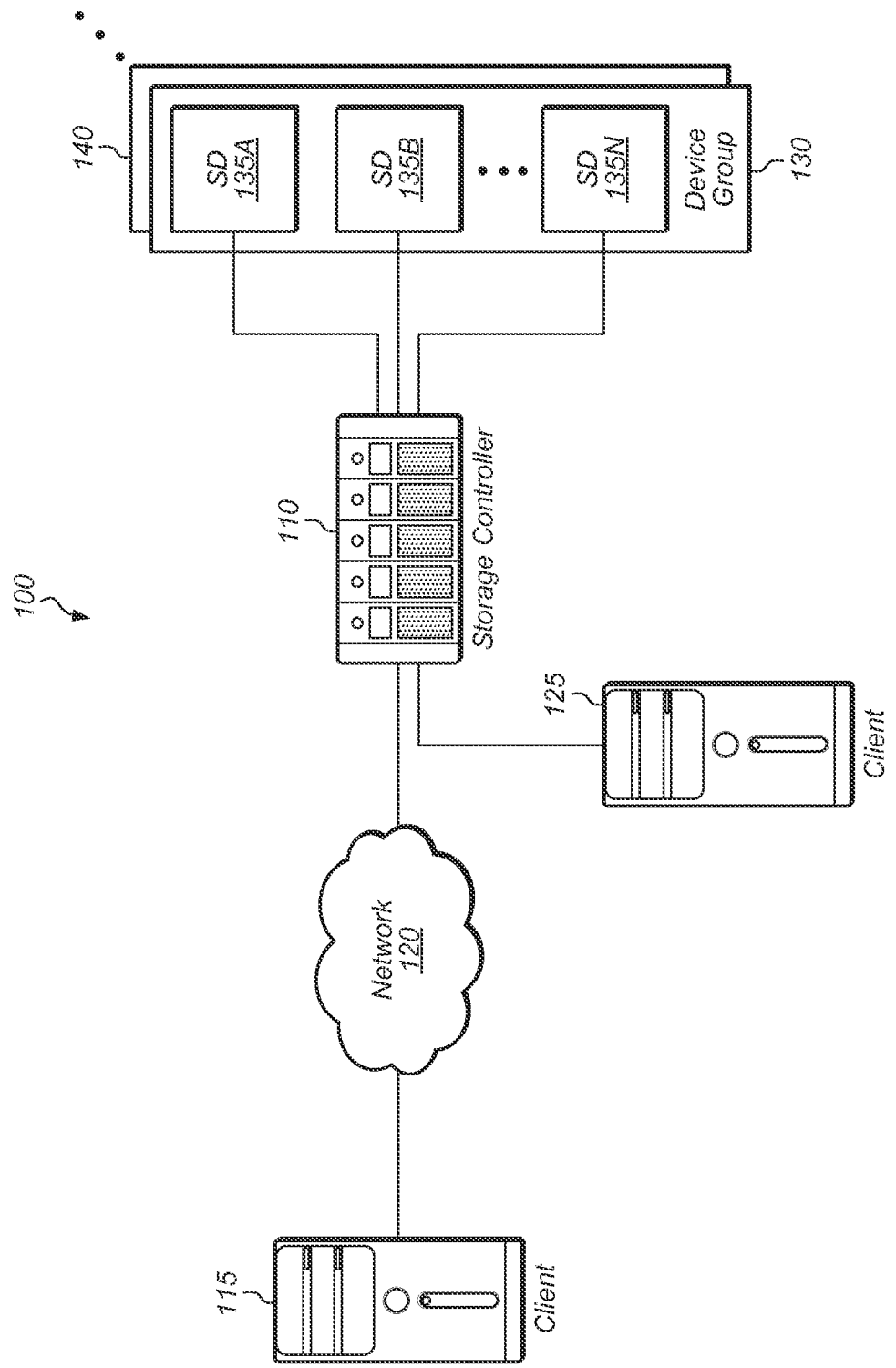
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A computing system comprising a plurality of storage devices . . . ." Such a claim does not foreclose the computing system from including additional components (e.g., a network interface, one or more processors, a storage controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage device group 140 may also include a plurality of storage devices which are not shown to avoid obscuring the figure.

Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, portions or the entirety of storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. The host computing device(s) may be servers, workstations, or other types of computing devices. In some embodiments, storage controller 110 may include or execute on one or more file servers and/or block servers. Storage controller 110 may use any of various techniques for replicating data across devices 135A-N to prevent loss of data due to the failure of a device or the failure of storage locations within a device.

The file system of storage controller 110 may manage blocks of data according to a file system object, such as a file, volume, segment, or other type of object. Each block of data may be associated with the identifier of the object (e.g., file ID, segment number) and the offset of the block within the object. In one embodiment, storage controller 110 may provide a given storage device with file system object information directly, allowing the given storage device to maintain the mapping between the file system object and the actual physical location, and freeing storage controller 110 from having to maintain this mapping information. Instead, storage controller 110 may maintain only a minimal amount of information about the file system objects. For example, in one embodiment, storage controller 110 may maintain a table with one entry per object detailing information including the object's creation time, current usage statistics, and an object ID. Accordingly, block address generation may be simplified for storage controller 110 without needing to reference a complex mapping table to determine the address of a specific block of a given object. When storage controller 110 creates a new object, the new object may be given an ID one greater than any previously-used object ID. In this way, storage controller 110 can ensure that the blocks in this new object do not reuse any previously used addresses.

In one embodiment, a given storage device 135 may receive read and write memory operations generated by storage controller 110. Each memory operation may include an address composed of a file system object number (or ID) and an offset for the data block in question. Each storage device may include a translation layer, and the translation layer may include a mapping table to map an object number and offset received with a given memory operation to a corresponding physical storage location. The translation layer may export an address space larger than the capacity of the storage device, which allows storage controller 110 to write a data block to a first address, wherein the first address has a value larger than a capacity of block storage locations in the storage device.

For example, in one embodiment, a given storage device 135A may have 1024 addressable storage locations for storing a block of data. The given storage device 135A may utilize 10 address bits to address these 1024 storage locations. The translation layer on this given storage device 135A may allow storage controller 110 to write to addresses with more than 10 address bits. For example, storage controller 110 may utilize 16 address bits for addressing memory operations to the given storage device 135A. This provides storage controller 110 with 65,536 different block addresses to use for memory operations targeting the given storage device 135A. The storage controller 110 may actually only use a small percentage of these 65,536 addressable locations to prevent the given storage device 135A from being oversubscribed. Therefore, the address space of storage controller 110 may be described as being a sparse address space, where only a portion of the total address space is being utilized at any given time. The translation layer of the given storage device 135A may map received 16-bit length addresses to 10-bit addresses corresponding to actual physical storage locations. It is noted that this scenario of using a 16-bit address length at storage controller 110 and a 10-bit address length at storage device 135A is merely one example of a thin-provisioned storage device implementation. Other bit-lengths for addresses at the storage controller 110 and the storage device 135A may be utilized in other embodiments. Generally speaking, the address space size may be larger at storage controller 110 than the total amount of free space on storage devices 135A. In some embodiments, the bit-lengths for addresses at storage controller 110 and storage devices 135A may be the same size, but there may be more available storage locations at storage controller 110 than in storage devices 135A.

In some embodiments, storage controller 110 may be coupled to multiple storage devices 135A-N. The total number of addressable storage locations on all of the storage devices coupled to storage controller 110 may be less than the number of addresses in the address space utilized by storage controller 110. For example, in one scenario, storage controller 110 may be coupled to 16 storage devices, and each storage device may have 2^16 addressable storage locations for data blocks. The combined total of all addressable storage locations on all 16 storage devices in this scenario would be 2^20 (2^16*16 storage devices). The storage controller 110 may utilize an address space of 2^48 addresses in this scenario, which exceeds the combined capacity of all 16 storage devices. Other scenarios may have other numbers of storage devices with other capacities, and the combined total capacity of all storage devices coupled to the storage controller may be less than the size of the address space utilized by the storage controller for generating object addresses.

In embodiments where storage controller 110 is coupled to multiple storage devices, storage controller 110 may utilize any of various techniques for spreading memory operations out to the multiple storage devices. For example, in one embodiment, storage controller 110 may determine which storage device to send a given memory operation based on a modulo operation performed on the offset portion of the address. Accordingly, in an embodiment with 8 storage devices, storage controller 110 may take the offset portion of the address modulo 8 and use this to map a value of 0 to the first storage device, a value of 1 to the second storage device, and so on. Other techniques for distributing memory operations to multiple storage devices are possible and are contemplated. These techniques may also be utilized for other types of computing devices (besides storage controllers) which are coupled to multiple storage devices.

In one embodiment, a given storage device 135B may declare itself to have a larger capacity than it actually possesses. Storage controller 110 may receive and believe this "dishonest" declaration from the given storage device 135B. Accordingly, storage controller 110 may operate under the assumption that each block address being generated by its file system and conveyed to the given storage device 135B is being mapped directly to an addressable block storage location. In effect, the given storage device 135B is hiding the fact that it is thin-provisioned from storage controller 110, and device 135B is also hiding the underlying mapping of object addresses to physical addresses from storage controller 110. This scheme may allow legacy operation systems, file systems, interface protocols, and/or interface logic to be used by storage controller 110 when interfacing with solid-state storage devices. The given storage device 135B may also be able to use legacy interface logic to communicate with storage controller 110 based on using this "dishonest" declaration scheme.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
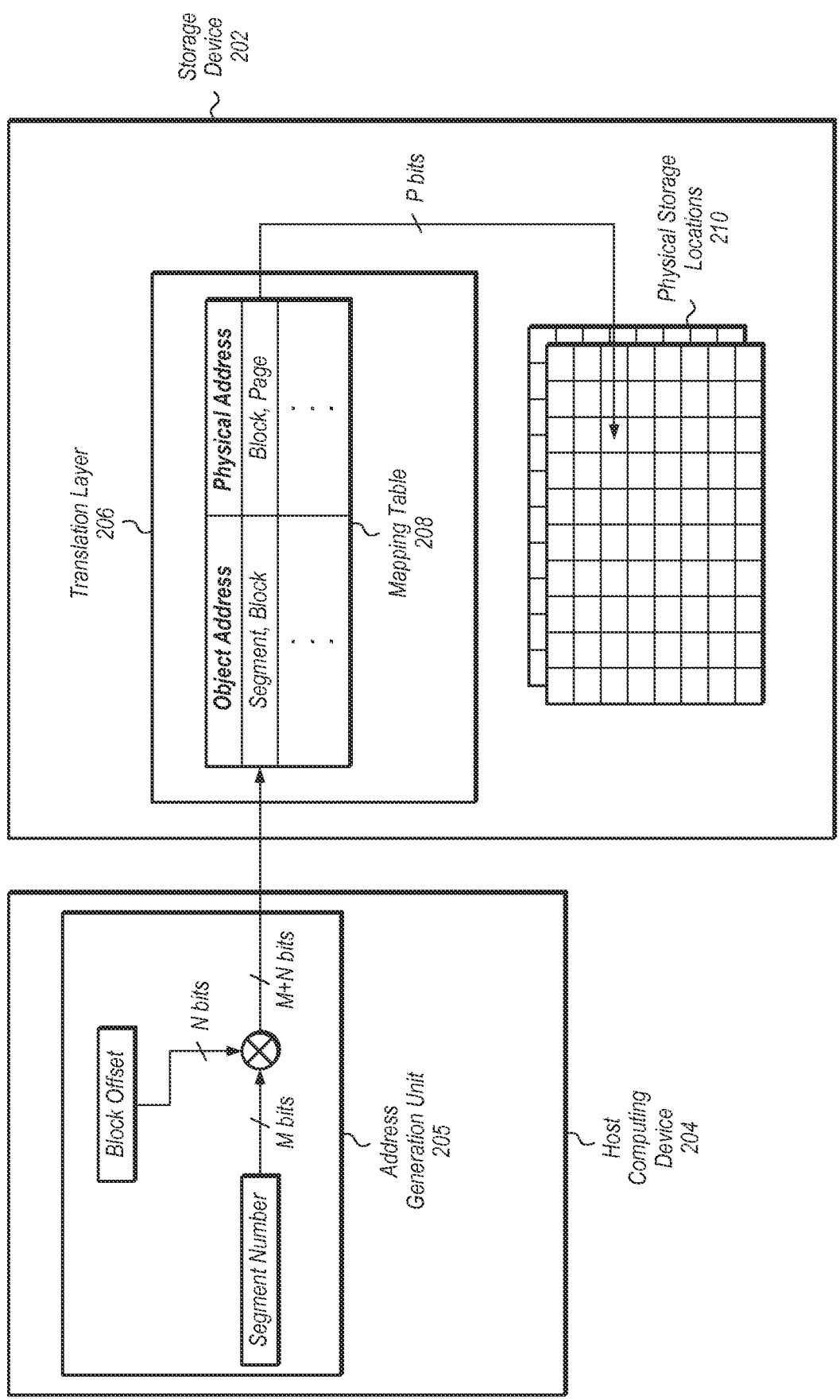
FIG. 2 is a generalized block diagram of one embodiment of a host computing device coupled to a storage device.

Turning now to FIG. 2, a block diagram of one embodiment of a host computing device coupled to a storage device is shown. Host computing device 204 may include address generation unit 205 for generating addresses for segments of memory operations being conveyed to storage device 202. Address generation unit 205 may generate addresses for a memory operation from the corresponding segment number and block offset. For example, in one embodiment, segments may be 8 megabytes (MB) in length and blocks may be 4 kilobytes (KB) long, resulting in 2048 blocks per segment. Address generation unit 205 may construct block addresses by concatenating the segment number with an 11-bit block offset and passing the resultant address to storage device 202. It is noted that the block diagram of address generation unit 205 is a logical representation of address generation unit 205. Address generation unit 205 may be implemented using hardware and/or software, depending on the embodiment.

Storage device 202 may include translation layer 206 and non-volatile physical storage locations 210. Storage device 202 may also include other components (e.g., buffer, processor) which are not shown to avoid obscuring the figure. Translation layer 206 may be part of the interface logic utilized by storage device 202 to interface with host computing device 204 and to process received memory operations. Translation layer 206 may be referred to as a flash translation layer in embodiments where storage device 202 is a flash memory device.

Translation layer 206 may be configured to translate addresses from a sparse address space utilized by host computing device 204 to the physical address space corresponding to physical storage locations 210. Translation layer 206 may present an address space to host computing device 204 which is larger than the storage capacity of storage device 202. Translation layer 206 may be implemented using any suitable combination of hardware and/or software.

In one embodiment, the interface between host computing device 204 and storage device 202 may be a custom designed interface. Alternatively, in other embodiments, the interface may utilize a standard communication protocol. For example, the interface between host computing device 204 and storage device 202 may utilize a Serial Advanced Technology Attachment ("SATA") protocol bus, a Small Computer System Interface ("SCSI") protocol bus, a Serial Attached SCSI ("SAS") protocol bus, or any of various other communication protocols. In one embodiment, the protocol utilized on the interface between host computing device 204 and storage device 202 may utilize a fixed-width address for addressing blocks. The protocol may also support only a single volume per storage device 202, and the number of blocks storage device 202 can store may be less than the number of blocks the protocol can address.

Translation layer 206 may include mapping table 208 for mapping file system object addresses received from host computing device 204 to specific locations within physical storage locations 210. Mapping table 208 may include multiple levels and may be arranged in any suitable fashion, depending on the embodiment. For example, mapping table 208 may implement a fully associative mapping, set associative mapping, or direct mapping, depending on the embodiment. It is noted that translation layer 206 may also include other logic which is not shown to avoid obscuring the figure.

In one embodiment, for a given data block managed by host computing device 204, the segment number of the segment containing the data block may be concatenated with the offset of the data block within the segment to generate the address of the data block, and this address may be conveyed to storage device 202. The segment number may be M bits and the block offset may be N bits, resulting in an address length of M+N bits which is conveyed to storage device 202. This approach simplifies address generation and allows host computing device 204 to avoid having to maintain a mapping table to translate addresses of data blocks to logical or physical addresses. Instead, host computing device 204 and storage device 202 are able to share a single mapping table 208 for mapping segments to physical addresses.

Memory operations may be conveyed by host computing device 204 to storage device 202, and each memory operation may include an object address generated from the corresponding segment number and block offset. When a memory operation is received by storage device 202, the segment number and block offset address may be translated to a physical address using mapping table 208. In one embodiment, each physical address may indicate a corresponding block and page of physical storage locations 210. The physical address may be of size P bits, wherein P is less than the size (M+N) of the object address received by storage device 202. In other words, the address space utilized by host computing device 204 to manage segments targeting storage device 202 is larger than the capacity of physical storage in storage device 202. Accordingly, translation layer 206 may be configured to allow host computing device 204 to write a data block to a first address (in the address space of host computing device 204), wherein the first address has a value larger than the capacity of block storage locations in storage device 202. The values P, M, and N are assumed to be positive integers for the purposes of this discussion.

In one embodiment, with a segment length of 8 MB, if storage device 202 has a capacity of 50,000 segments, then storage device 202 has a storage capacity of 400 gigabytes (GB). However, some of the data utilized by host computing device 204 might not be within the first 400 GB of address space. For example, host computing device 204 might create 200,000 segments interspersed with invalidation of 160,000 segments, leading to a maximum address space of 1.6 terabytes (TB), but only actually storing 320 GB of data on storage device 202, which is within its 400 GB capacity. If a segment is no longer needed, host computing device 204 may use a TRIM command to inform storage device 202 that it can free the blocks associated with the segment. If a new segment is created, rather than reusing a segment ID from an old segment, host computing device 204 can simply create a new segment ID by incrementing the largest previously-used segment ID.

If the memory operation is a read operation and a lookup corresponding to the memory operation hits an existing entry in mapping table 208, then the read operation may be performed to the corresponding physical address retrieved from the hit entry. Write operations which are received by storage device 202 may result in new entries being generated for mapping table 208. If a write operation hits in mapping table 208, then the physical address of the hit entry may be invalidated (and erased at a later point in time), and a new entry may be recorded in mapping table 208 which maps the segment number and block offset address to the new physical address allocated for the write operation. During garbage collection operations or other internal-device processes, mapping table 208 may be updated as data is moved between physical storage locations.

Figure 3:
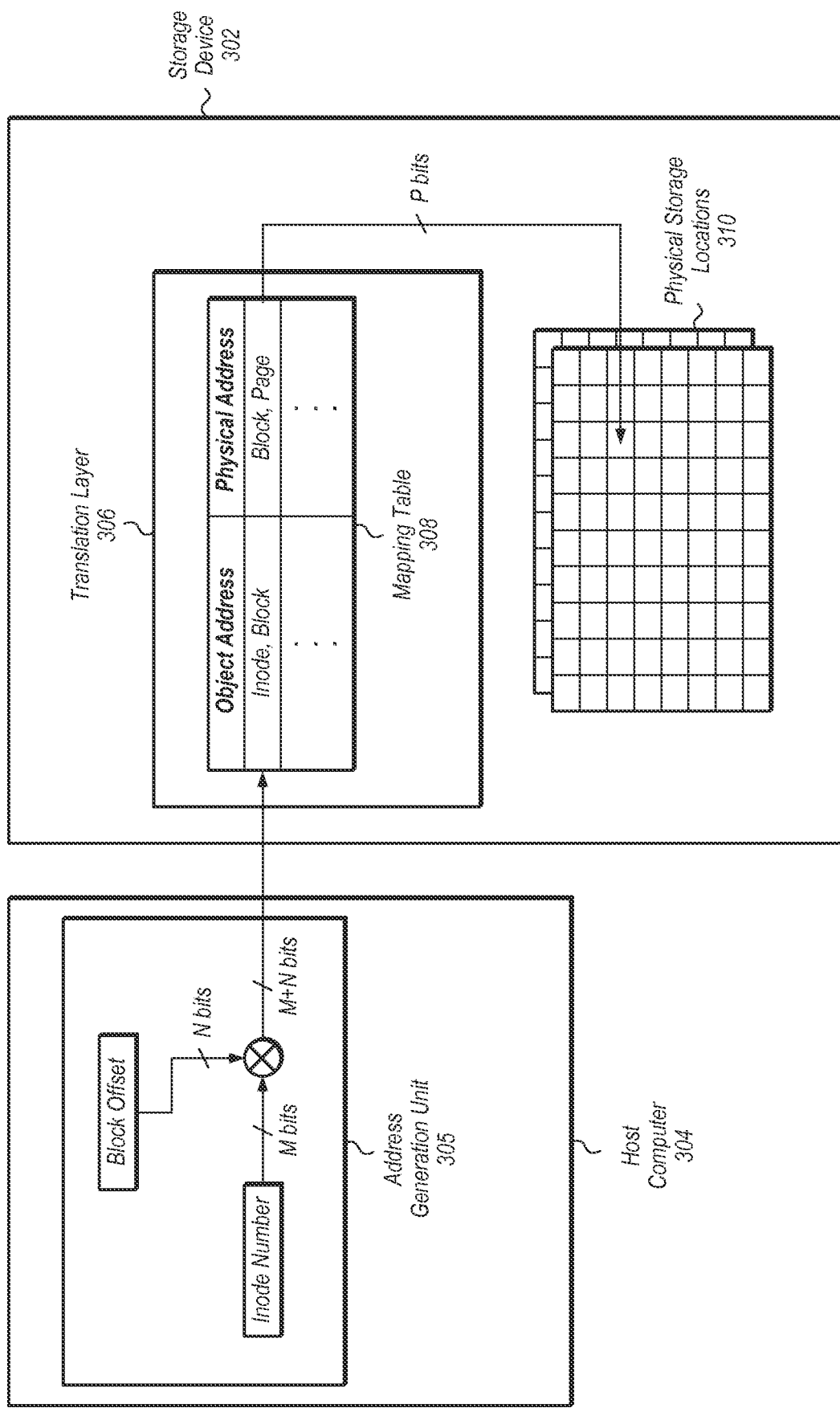
FIG. 3 is a generalized block diagram of another embodiment of a host computing device coupled to a storage device.

Turning now to FIG. 3, a block diagram of another embodiment of a host computing device coupled to a storage device is shown. As shown in FIG. 3, host computer 304 is coupled to storage device 302. Host computer 304 includes address generation unit 305, and storage device includes physical storage locations 310 and translation layer 306, which includes mapping table 308.

In contrast to FIG. 2, address generation unit 305 of FIG. 3 may generate an address of a memory operation based on an inode number instead of using a segment number. Host computer 304 may include a file system which tracks data based on files and block offsets within the file, and the file system may map each file name to an inode number.

It is noted that in other embodiments, other file system objects may be utilized by address generation unit 305 of host computer 304 for generating addresses associated with memory operations. For example, in another embodiment, the file system may track data according to volumes, and the volume numbers and offsets may be utilized for generating addresses in address generation unit.

Mapping table 308 of translation layer 306 may map object addresses to physical addresses, and each object address in this case may be an inode number concatenated with an offset. Storage device 302 may be configured in a similar manner to storage device 202 of FIG. 2, and the description of storage device 202 may also apply to storage device 302.

Figure 4:
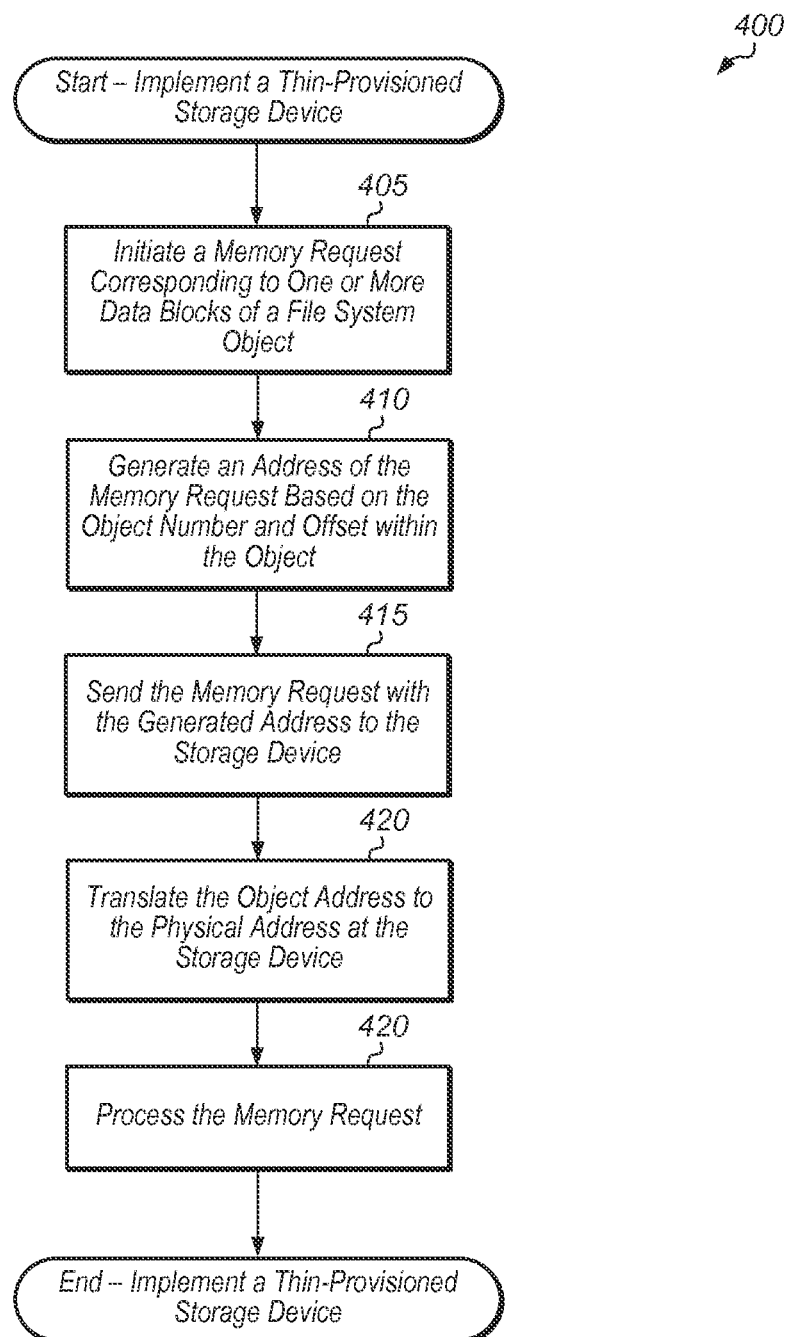
FIG. 4 is a generalized flow diagram illustrating one embodiment of a method for implementing a thin-provisioned storage device.

Turning now to FIG. 4, one embodiment of a method 400 for implementing a thin-provisioned storage device is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A host computing device may initiate a memory request corresponding to one or more data blocks of a file system object (block 405). The file system object may be a file, segment, volume, or another type of object depending on the embodiment. The host computing device may generate an address of the memory request based on an object number (or ID) and an offset of the first block (of the one or more blocks) within the object (block 410). The address of the memory request may be N bits in length. Therefore, for an address of N bits in length, there are a total of 2N possible addresses that may be utilized in this address space. In one embodiment, the file system object may be a file and the file system may use the inode number corresponding to the file as the first part of the address. The second part of the address may be the offset of the data block within the file. In one embodiment, the inode number may be represented by 24 bits and the offset may be represented by 24 bits, making the length of the address equal to 48 bits. This would give the file system a total of 248 different addresses in the address space when mapping requests to a storage device coupled to the host computing device. It may be assumed for the purposes of this discussion that the host computing device is coupled to a single storage device.

Next, the host computing device may send the memory request with the generated address to the storage device (block 415). In response to receiving the memory request, the storage device may translate the object address of the memory request to a physical address (block 420). In one embodiment, the storage device may maintain a mapping table to translate received object addresses to physical addresses. If the object address of the memory request is a new address, or if the memory request is a write request, then the storage device may generate a new physical address for this object address and store this new mapping in the mapping table. In one embodiment, the request sent from the host computing device to the storage device may be a TRIM command, and the TRIM command may specify a file system object which has been deleted. A TRIM command is an example of one technique in which the host computing device may inform the storage device that an address range has been deleted and that the storage device may "forget" about a range of identifiers. In response to receiving the TRIM command, the storage device may reclaim the storage locations utilized by these range of identifiers.

The address space of all possible object addresses may exceed the physical capacity of the storage device. In other words, the bit length of object addresses may be larger than the bit length of physical addresses stored in the table. For example, in one embodiment, object addresses may be 48 bits in length and physical addresses may be 20 bits in length. In other embodiments, other object address bit-lengths and other physical address bit-lengths may be utilized.

After block 420, the storage device may process the memory request using the physical address translated from the object address (block 425). The processing of the memory request may be performed using any of various techniques well known to those skilled in the art. If the memory request is a TRIM command, the storage controller may reclaim the blocks corresponding to the specified address range. After block 425, method 400 may end.

Figure 5:
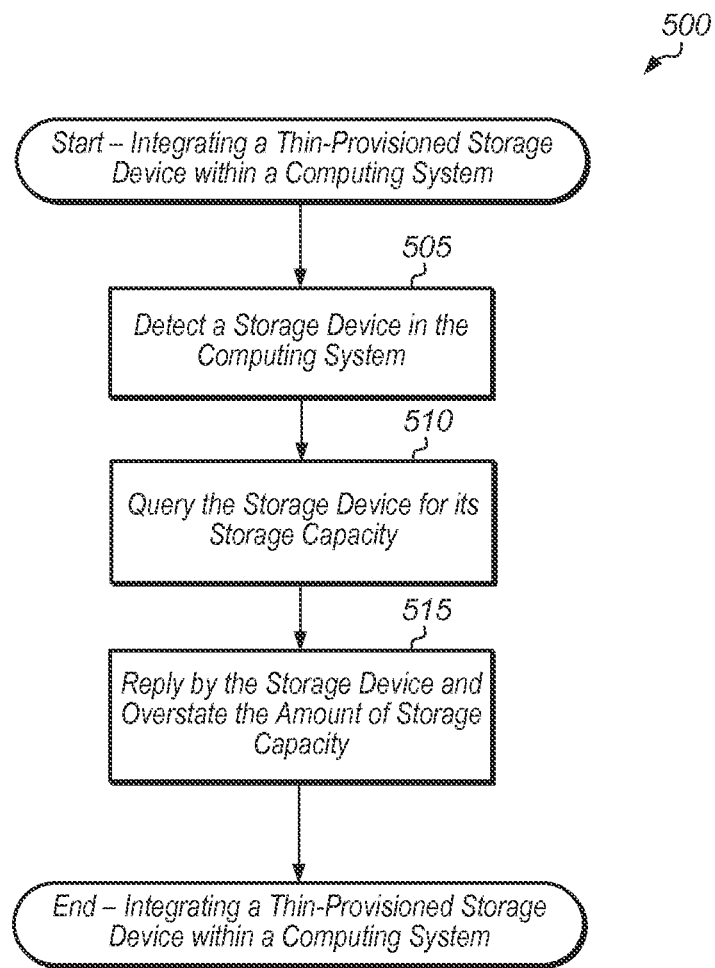
FIG. 5 is a generalized flow diagram illustrating one embodiment of a method for integrating a thin-provisioned storage device within a computing system.

Referring now to FIG. 5, one embodiment of a method for integrating a thin-provisioned storage device within a computing system is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A computing system may detect a storage device connected to the computing system (block 505). In one embodiment, the computing system may be a server and the storage device may be a storage device (e.g., solid state drive) in the server. In another embodiment, the computing system may be a tablet and the storage device may be a flash memory device integrated within the tablet. In other embodiments, other types of computing systems (e.g., desktop computer, smartphone) may be utilized with any of various types of storage devices. In response to detecting the presence of the storage device, the computing system may query the storage device for its storage capacity (block 510). In response to receiving the query, the storage device may "lie" and overstate the amount of storage capacity it contains (block 515).

In one embodiment, the storage device may reply to the computing system's query with the maximum possible storage capacity based on the number of supported address bits which are available on the interface connection between the computing system and the storage device. For example, if the storage device uses the Serial Advance Technology Attachment (SATA) protocol to communicate with the computing system host, the number of supported address bits may be 48, and the storage device may reply that it contains 248 addressable blocks, even though this may far exceed the amount of addressable blocks on the storage device. In other embodiments, the storage device may utilize other types of protocols or interfaces to communicate with the computing system, and these other types of interfaces may support other numbers of address bits besides 48.

By overstating its storage capacity, the storage device provides the computing system host with more flexibility in selecting addresses for file system objects that are stored on the storage device. For example, when the computing system needs to generate an ID for a new file system object, instead of reusing an ID from an old object, the computing system may increment the largest previously used ID and to create a new ID for the new object. The large address space exported by the storage device enables this flexibility in generating IDs for the computing system.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A storage controller configured to:
transmit a query to one or more storage devices for corresponding physical storage capacities of the one or more storage devices;
receive corresponding physical storage values of the one or more storage devices that are different from the corresponding physical storage capacities of the one or more storage devices;
generate an address for an I/O operation that is to be directed to the one or more storage devices based on the corresponding physical storage values; and
issue an I/O operation to the one or more storage devices using the generated address.

2. The storage controller of claim 1 wherein the I/O operation is issued using a protocol that addresses blocks with a fixed-width address.

3. The storage controller of claim 2, wherein the protocol is Serial Advanced Technology Attachment (SATA), Small Computer System Interface (SCSI) or Serial Attached SCSI (SAS).

4. The storage controller of claim 1 wherein the storage controller includes a translation layer that maintains a mapping table to map addresses in an exported address space to addressable storage locations on the one or more storage devices, wherein the one or more storage devices include a first number of addressable storage locations and the exported address space has a second number of addressable storage locations, wherein the second number is greater than the first number.

5. The storage controller of claim 4 wherein the mapping table is updated during garbage collection.

6. The storage controller of claim 4 wherein the mapping table maps object addresses to physical addresses in the one or more storage devices.

7. The storage controller of claim 1 wherein the storage controller is coupled to multiple storage devices, and the storage controller is further configured to distribute I/O operations amongst the multiple storage devices.

8. A method comprising:
transmitting a query to one or more storage devices for a physical storage capacity of the one or more storage devices;
receiving corresponding physical storage values of the one or more storage devices that are different from corresponding physical storage capacities of the one or more storage devices;
generating an address for an I/O operation that is to be directed to the one or more storage devices based on the corresponding physical storage values; and
issuing an I/O operation to the one or more storage devices using the generated address.

9. The method as recited in claim 8, wherein the I/O operation is issued using a protocol that addresses blocks with a fixed-width address.

10. The method as recited in claim 9, wherein the protocol is Serial Advanced Technology Attachment (SATA), Small Computer System Interface (SCSI) or Serial Attached SCSI (SAS).

11. The method as recited in claim 8, further comprising maintaining a mapping table to map addresses in an exported address space to addressable storage locations on the one or more storage devices, wherein the one or more storage devices include a first number of addressable storage locations and the exported address space has a second number of addressable storage locations, wherein the second number is greater than the first number.

12. The method as recited in claim 11, wherein the mapping table is updated during garbage collection.

13. The method as recited in claim 11, wherein the mapping table maps object addresses to physical addresses in the one or more storage devices.

14. The method as recited in claim 8, further comprising distributing I/O operations amongst the one or more storage devices.

15. A non-transitory computer readable storage medium comprising program instructions, wherein the program instructions are executable to:
transmit a query to one or more storage devices for a physical storage capacity of the one or more storage devices;

receive corresponding physical storage values of the one or more storage devices that are different from corresponding physical storage capacities of the one or more storage devices;

generate an address for an I/O operation that is to be directed to the one or more storage devices based on the corresponding physical storage values; and issue an I/O operation to the one or more storage devices using the generated address.

16. The non-transitory computer readable storage medium as recited in claim 15, wherein the I/O operation is issued using a protocol that addresses blocks with a fixed-width address.

17. The non-transitory computer readable storage medium as recited in claim 16, wherein the protocol is Serial Advanced Technology Attachment (SATA), Small Computer System Interface (SCSI) or Serial Attached SCSI (SAS).

18. The non-transitory computer readable storage medium as recited in claim 15, wherein the program instructions are further executable to maintain a mapping table to map addresses in an exported address space to addressable storage locations on the one or more storage devices, wherein the one or more storage devices include a first number of addressable storage locations and the exported address space has a second number of addressable storage locations, wherein the second number is greater than the first number.

19. The non-transitory computer readable storage medium as recited in claim 18, wherein the mapping table is updated during garbage collection.

20. The non-transitory computer readable storage medium as recited in claim 18, wherein the mapping table maps object addresses to physical addresses in the one or more storage devices.

* * * * *